(12) United States Patent
Sasaki

(10) Patent No.: US 9,874,677 B2
(45) Date of Patent: Jan. 23, 2018

(54) LIGHT SOURCE DEVICE AND DISPLAY APPARATUS

(71) Applicant: Sakai Display Products Corporation, Sakai-shi, Osaka (JP)

(72) Inventor: Tomoo Sasaki, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/121,707

(22) PCT Filed: Apr. 16, 2014

(86) PCT No.: PCT/JP2014/060858
§ 371 (c)(1),
(2) Date: Aug. 25, 2016

(87) PCT Pub. No.: WO2015/159396
PCT Pub. Date: Oct. 22, 2015

(65) Prior Publication Data
US 2017/0123138 A1  May 4, 2017

(51) Int. Cl.
*G02F 1/1339* (2006.01)
*F21V 8/00* (2006.01)
*G02F 1/1333* (2006.01)

(52) U.S. Cl.
CPC ......... *G02B 6/0053* (2013.01); *G02B 6/0031* (2013.01); *G02B 6/0051* (2013.01);
(Continued)

(58) Field of Classification Search
CPC .. G02B 6/0053; G02B 6/0031; G02B 6/0051; G02B 6/0085; G02F 1/133308
See application file for complete search history.

(56) References Cited

U.S. PATENT DOCUMENTS 6,055,029 A * 4/2000 Kurihara .............. G02B 6/0088
349/58
2010/0066937 A1 3/2010 Yamashita et al.
(Continued)

FOREIGN PATENT DOCUMENTS

JP 2010-072262 A 4/2010
JP 2013-114811 A 6/2013
(Continued)

*Primary Examiner* — James Dudek
(74) *Attorney, Agent, or Firm* — Rudy J. Ng; Bret E. Field; Bozicevic, Field & Francis LLP

(57) ABSTRACT

The present invention provides a light source device which includes a light guide plate configured to emit light entered from a light source of a side face through one surface of the light guide plate, and an optical sheet disposed to face the one surface of the light guide plate, wherein the light source device includes interval holding parts which are provided along side faces of the light guide plate, and are configured so that one end portions thereof are disposed between the optical sheet and the light guide plate to maintain an interval between the optical sheet and the light guide plate, and the one end portions of the interval holding parts have a white color, such that it is possible to prevent shadows of the interval holding parts from being reflected on the display panel provided on a front side of the optical sheet, and a display apparatus including the light source device.

8 Claims, 5 Drawing Sheets

(52) U.S. Cl.
CPC ..... *G02B 6/0085* (2013.01); *G02F 1/133308* (2013.01); *G02F 2001/13332* (2013.01)

(56) References Cited

U.S. PATENT DOCUMENTS

| | | | |
|---|---|---|---|
| 2013/0027857 A1* | 1/2013 | Jeong | G02F 1/133308 361/679.01 |
| 2013/0135898 A1 | 5/2013 | Horikawa et al. | |
| 2013/0322113 A1 | 12/2013 | Yang | |
| 2015/0192822 A1* | 7/2015 | Katou | G02F 1/133308 349/58 |
| 2015/0341587 A1 | 11/2015 | Chikazawa | |

FOREIGN PATENT DOCUMENTS

| | | |
|---|---|---|
| JP | 2013-246439 A | 12/2013 |
| JP | 2014-006352 A | 1/2014 |

\* cited by examiner

LIGHT SOURCE DEVICE AND DISPLAY APPARATUS

This application is the national phase under 35 U.S.C. § 371 of PCT International Application No. PCT/JP2014/060858 which has an International filing date of Apr. 16, 2014 and designated the United States of America.

BACKGROUND

Technical Field

The present invention relates to a light source device which includes a light guide plate configured to emit light entered from a light source in the vicinity of a side face of the light guide plate through one surface thereof, and an optical sheet disposed to face the one surface of the light guide plate, and a display apparatus including the light source device.

Description of Related Art

Recently, liquid crystal display apparatuses have been widely distributed, and displaying an image with higher image quality is required.

Meanwhile, Japanese Patent Laid-Open Publication No. 2010-072262 discloses a liquid crystal display apparatus which is provided with a recess part extending from an LED light source block to at least one part of a light guide plate and a reflection sheet, in an end portion of a panel frame on which the LED light source block is disposed, and is further provided with a reflection-heat insulation member extending from an end portion of the LED light source block to at least one part of the light guide plate and the reflecting sheet, and fixed to the panel frame, in the recess part, such that an extraction efficiency of light is improved, and a deterioration in an optical member is suppressed, thus to have good optical properties.

SUMMARY

Meanwhile, in order to widen an image display region in a display panel on which an image is displayed, it is necessary to reduce a portion occupied by a so-called bezel.

When reducing the portion occupied by the bezel, there is a problem that shadows of components provided around the light guide plate are reflected on the display panel. Whereas, such the problem is not considered in the liquid crystal display apparatus of Japanese Patent Laid-Open Publication No. 2010-072262, and it is not possible to cope with the same.

In consideration of the above-mentioned circumstances, it is an object of the present invention to provide a light source device which includes a light guide plate configured to emit light entered from a light source of a side face of the light guide plate through one surface of the light guide plate, and an optical sheet disposed to face the one surface of the light guide plate, wherein the light source device includes interval holding part which is provided along side face of the light guide plate, and is configured so that one end portion thereof is disposed between the optical sheet and the light guide plate to maintain an interval between the optical sheet and the light guide plate, and the one end portion of the interval holding part has a white color, such that it is possible to prevent shadows of the interval holding parts from being reflected on the display panel provided on a front side of the optical sheet and to provide a display apparatus including the light source device.

According to one embodiment of the present invention, there is provided a light source device which includes a light guide plate configured to emit light entered from a light source of a side face of the light guide plate through one surface of the light guide plate, and an optical sheet disposed to face the one surface of the light guide plate, comprising: interval holding part which is provided along side face of the light guide plate, and is configured so that one end portion thereof is disposed between the optical sheet and the light guide plate to maintain an interval between the optical sheet and the light guide plate, wherein the one end portion of the interval holding part has a white color.

According to the embodiment of the present invention, since the one end portion of the interval holding part has the white color, light emitted from the light guide plate is reflected by the one end portion, or is progressed by transmitting through the one end portion. Accordingly, when providing a display panel on a front side of the optical sheet, shadow of the interval holding part is not reflected thereon.

In the light source device according to the embodiment of the present invention, it is preferable that the interval holding part has an mounting portion which is connected to the one end portion and is provided at an outside of the light guide plate, wherein the mounting portion has a black color.

According to the preferable embodiment of the present invention, since the mounting portion has the black color, it is possible to prevent the light from the light source or the light guide plate to become a so-called leakage light to be leaked to an outside of the device.

In the light source device according to the embodiment of the present invention, it is preferable that a buffer member is provided between the one end portion of the interval holding part and the light guide plate, and the interval holding part has a boundary of different colors which is configured so as to be located at a contact portion between the buffer member and the interval holding part.

According to the preferable embodiment of the present invention, since the boundary of different colors of the interval holding part is configured so as to be located at the contact portion between the buffer member and the interval holding part, it is possible to solve both of the problem that the shadows are reflected on the display panel, and the problem that the leakage of light occurs, as described above.

According to one embodiment of the present invention, there is provided a display apparatus comprising: the light source device according to any one of claims 1 to 3; and a display panel configured to display an image using light passed through the optical sheet.

According to the embodiment of the present invention, light emitted by the light source device entered the display panel through the optical sheet. The display panel displays an image using the light entered.

According to the present invention, in the interval holding part, the one end portion disposed between the optical sheet and the light guide plate has the white color, such that it is possible to prevent the shadow of the interval holding part from being reflected on the display panel provided on a front side of the optical sheet.

The above and further objects and features will move fully be apparent from the following detailed description with accompanying drawings.

DETAILED DESCRIPTION

Hereinafter, an example in which a display apparatus according to an embodiment of the present invention is applied to a television receiving apparatus will be described in detail with reference to the accompanying drawings.

Figure 1:
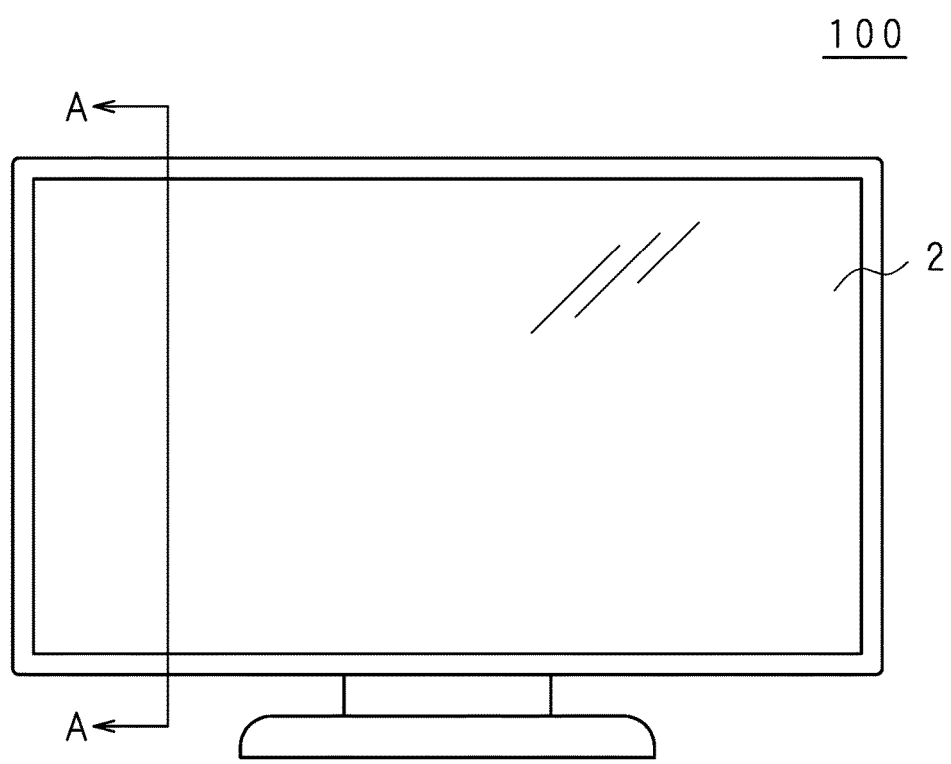
FIG. 1 is a front view illustrating an appearance of a television receiving apparatus according to an embodiment of the present invention.

FIG. 1 is a front view illustrating an appearance of a television receiving apparatus according to an embodiment of the present invention. In FIG. 1, a television receiving apparatus 100 according to the embodiment of the present invention is illustrated. Hereinafter, for the convenience of explanation, a horizontal direction and a vertical direction in the drawings are referred to as a lateral direction and a longitudinal direction, respectively.

Figure 2:
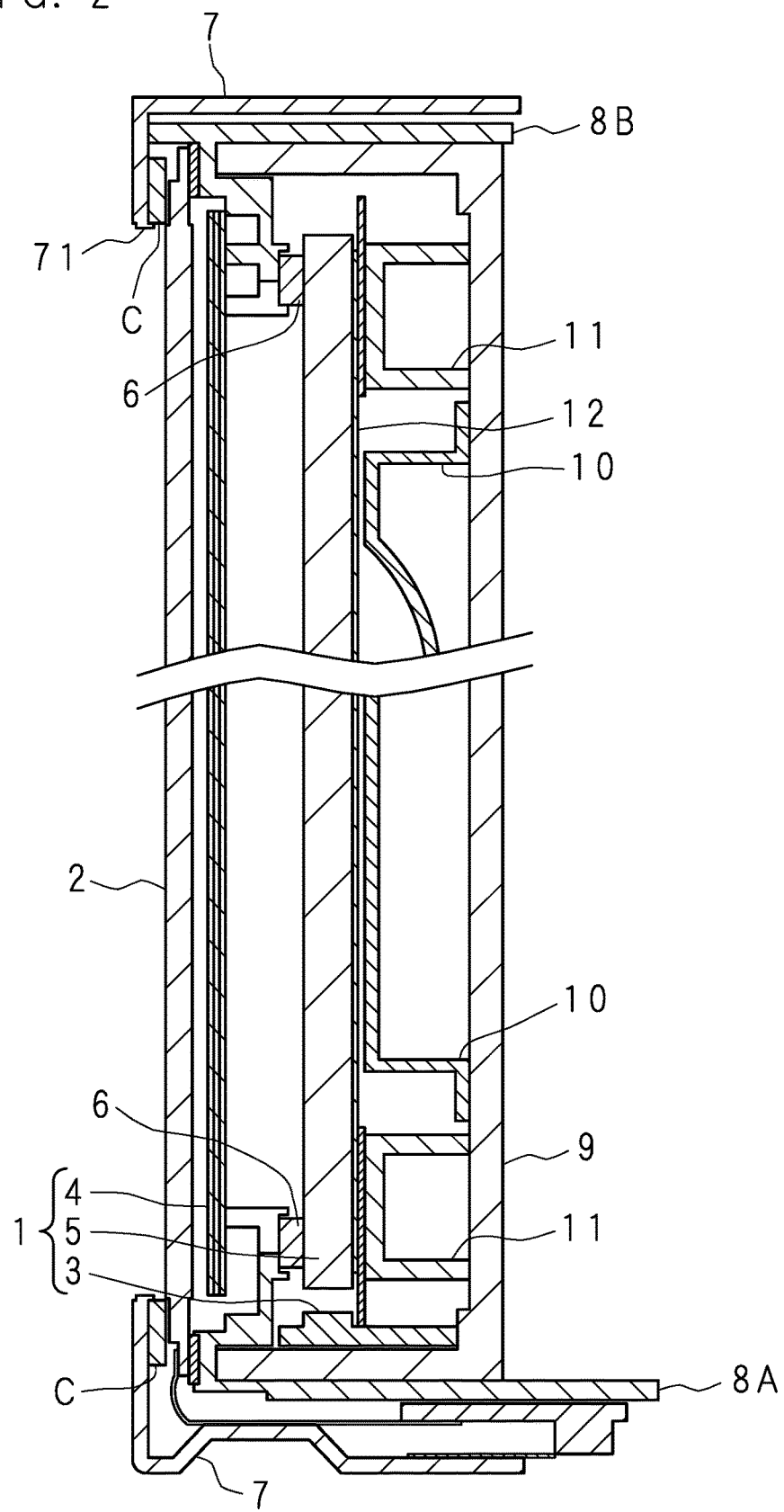
FIG. 2 is a longitudinal sectional view taken on line A-A in FIG. 1.

FIG. 2 is a longitudinal sectional view taken on line A-A in FIG. 1. The television receiving apparatus 100 according to the embodiment of the present invention, as illustrated in FIG. 1, includes a rectangular liquid crystal display panel 2 which displays an image on one surface of a front side. In addition, a light source device 1 which irradiates the liquid crystal display panel 2 with light is disposed on a rear side of the liquid crystal display panel 2.

Figure 3:
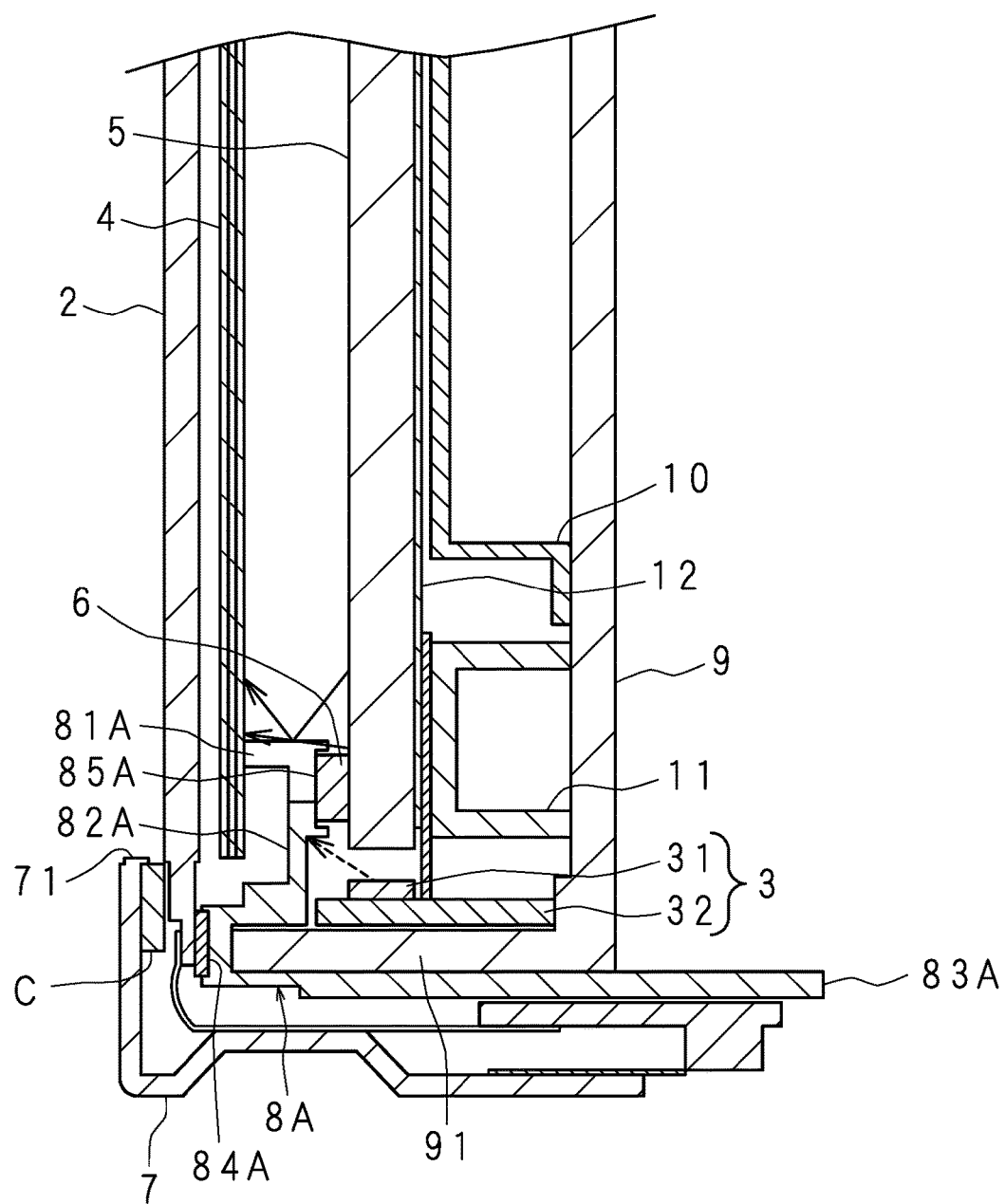
FIG. 3 is an enlarged view enlarging a lower portion in the longitudinal sectional view of FIG. 2.
Figure 4:
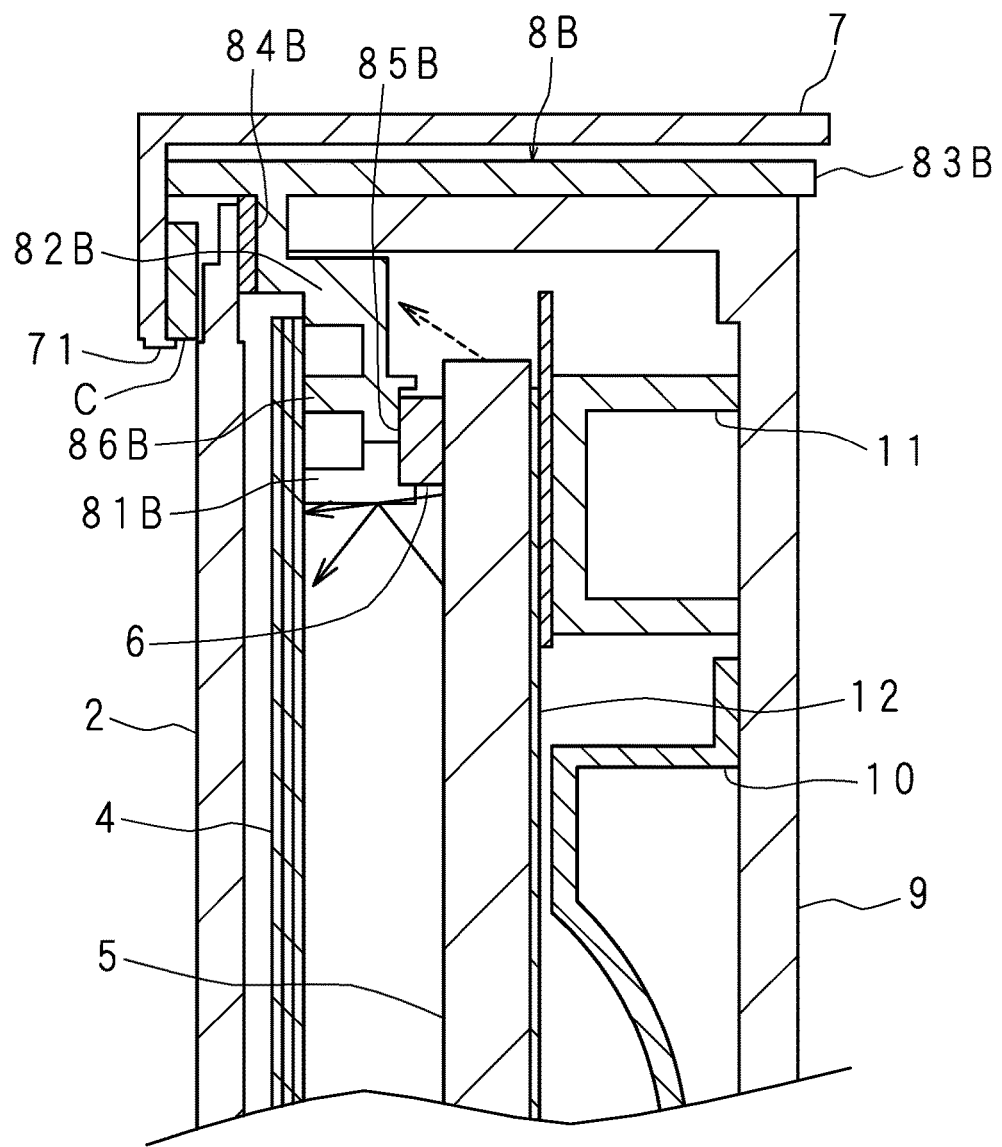
FIG. 4 is an enlarged view enlarging an upper portion in the longitudinal sectional view of FIG. 2.
Figure 5:
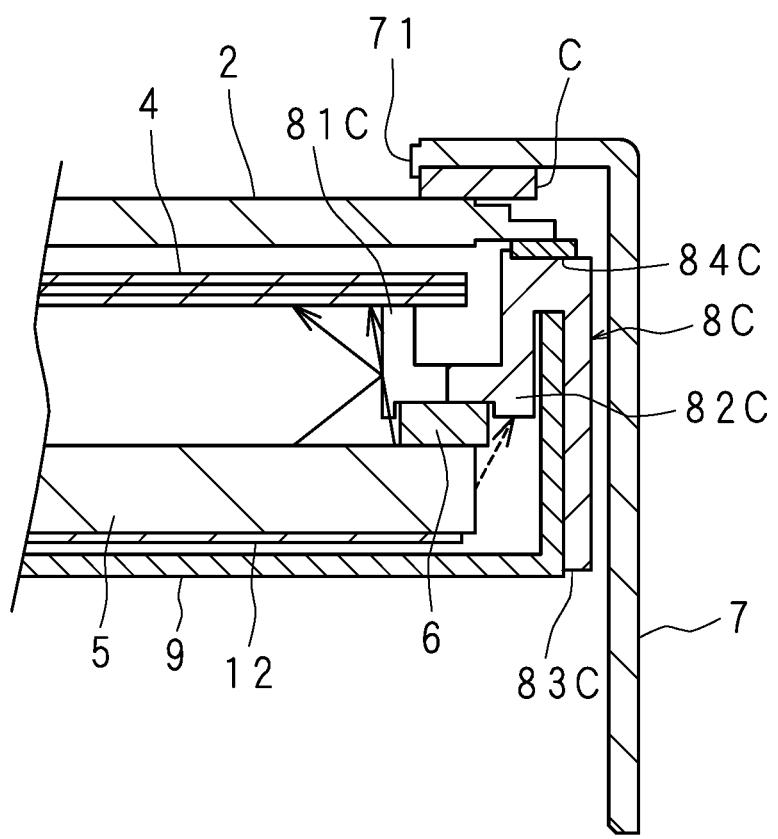
FIG. 5 is a cross sectional view of an end portion of the television receiving apparatus according to the embodiment of the present invention in a lateral direction thereof.

The light source device 1 includes light source units 3, an optical sheet 4, and a light guide plate 5. In addition, FIG. 3 is an enlarged view enlarging a lower portion in the longitudinal sectional view of FIG. 2, and FIG. 4 is an enlarged view enlarging an upper portion in the longitudinal sectional view of FIG. 2. Further, FIG. 5 is a cross sectional view of an end portion of the television receiving apparatus 100 according to the embodiment of the present invention in the lateral direction thereof.

The optical sheet 4 is disposed so that one surface thereof faces the other surface of the liquid crystal display panel 2, and the light guide plate 5 is disposed so that one surface thereof faces the other surface of the optical sheet 4. Further, a reflection sheet 12 is disposed so that one surface thereof faces the other surface of the light guide plate 5.

A front cover 7 is disposed on edge sides of the liquid crystal display panel 2. The front cover 7 has a hollow rectangular display window 71 copying a shape of the one surface of the liquid crystal display panel 2 viewed from a user. The user may view an image displayed on the one surface of the liquid crystal display panel 2 through the display window 71.

In addition, as illustrated in FIG. 2, peripheral edge portion of the one surface of the liquid crystal display panel 2 is covered with the display window 71. More particularly, the display window 71 holds the liquid crystal display panel 2 by pressing the peripheral edge portion of the liquid crystal display panel 2 to the light guide plate 5 side through cushions C provided along the peripheral edge portions of the one surface of the liquid crystal display panel 2.

Further, the liquid crystal display panel 2 is provided with a polarizing plate (not illustrated) on the other surface thereof, and is configured so that light entered is separated into P-waves (horizontal polarizing component) and S-waves (vertical polarizing component) by using the polarizing plate, then only the P-waves are transmitted toward the one surface, and the S-waves are absorbed by the polarizing plate. The liquid crystal display panel 2 may be an electrophoresis liquid crystal panel, for example.

The optical sheet 4 is a publicly known sheet that functions to diffuse and collect, etc., light emitted from the light source unit 3 and entered the optical sheet 4 through the light guide plate 5, so as to more uniformly emit the light toward the liquid crystal display panel 2. For example, the optical sheet 4 includes two diffusion sheets, and one prism sheet, wherein the prism sheet is disposed between the two diffusion sheets.

One diffusion sheet of the two diffusion sheets, which is disposed on the light guide plate 5 side, is an optical sheet that functions to diffuse light entered from the light source unit 3 through the light guide plate 5 and allow it to enter the prism sheet. In addition, the prism sheet is an optical sheet that functions to collect the light entered through the one diffusion sheet and emit it toward the other diffusion sheet. The light passing through the prism sheet enters the other diffusion sheet perpendicular to the prism sheet.

The other diffusion sheet of the two diffusion sheets, which is disposed on the liquid crystal display panel 2 side, is an optical sheet that functions to again diffuse the light entered through the prism sheet so as to have a more uniform luminance distribution and emit it toward the liquid crystal display panel 2.

The rectangular light guide plate 5 is disposed on the other surface side of the optical sheet 4. The light guide plate 5 guides light emitted by the light source unit 3 to the optical sheet 4 (liquid crystal display panel 2). For example, the light guide plate 5 may be configured in such a manner that the one surface thereof facing the other surface of the optical sheet 4 has an emitting surface on which a pattern is formed so that the light entered from the light source unit 3 is progressed in the liquid crystal display panel 2 direction. Thereby, the light guide plate 5 may convert the light entered from the light source unit 3 into flat light to uniformly transmit it to the optical sheet 4 through the emitting surface.

In addition, the light guide plate 5 is made of, for example, a high transparency acrylic resin, and the reflection sheet 12 is disposed on the other surface side of the light guide plate 5. That is, one surface of the reflection sheet 12 faces the other surface of the light guide plate 5.

The reflection sheet 12 is slightly larger than the light guide plate 5, and has a rectangular shape copying the light guide plate 5. In addition, the reflection sheet 12 irregularly reflects the light entered the light guide plate 5 from the light source unit 3 by the other surface side of the light guide plate 5 to emit it through the emitting surface of the light guide plate 5.

Spacers 11 are disposed on the other surface side of the reflection sheet 12 at the edge portion of the reflection sheet 12. In other words, the edge portion of the reflection sheet 12 is supported by the spacers 11, and an interval between the heat dissipation plate 9 to be described below is constantly held. The spacer 11 has a gutter shape and contacts with the other surface of the reflection sheet 12 by an outside of a bottom thereof.

Further, a so-called backlight chassis 10 is disposed on the other surface side of the reflection sheet 12 at portion other than the edge portion (hereinafter, referred to as residual portion). In other words, the residual portion of the reflection sheet 12 is supported by the backlight chassis 10 from the other surface side. The backlight chassis 10 has a gutter shape and contacts with the residual portion of the reflection sheet 12 by the outside of the bottom thereof. That is, an interval between the reflection sheet 12 (light guide plate 5) and the heat dissipation plate 9 is constantly held by the spacers 11 and the backlight chassis 10.

The heat dissipation plate 9 is disposed so as to face insides of the spacers 11 and an inside of the backlight chassis 10. The heat dissipation plate 9 is made of, for example, aluminum having good thermal conductivity. The heat dissipation plate 9 contacts with the spacers 11 and the backlight chassis 10 by one surface thereof.

The heat dissipation plate 9 is formed in a box shape having a rectangular bottom copying the light guide plate 5, and the bottom thereof has substantially the same dimensions as the light guide plate 5. In addition, the heat dissipation plate 9 has side wall parts which rise from each edge of the bottom to the light guide plate 5 side. A side wall part 91 on the light source unit 3 side among the side wall parts is provided on the other surface side of the substrate 32 of the light source unit 3 to be described below, along the other surface. In other words, the side wall part 91 is disposed between interval holding parts 8 to be described below and the substrate 32.

Further, the television receiving apparatus 100 according to the embodiment of the present invention includes the above-described interval holding parts 8 configured to hold each of the liquid crystal display panel 2, the optical sheet 4 and the light guide plate 5 at a prescribed interval. The interval holding parts 8 are provided along edge portion of the liquid crystal display panel 2, the optical sheet 4 and the light guide plate 5. The interval holding parts 8 include a lower interval holding part 8A provided at a lower edge portion in the longitudinal direction, that is, in the vicinity of the light source unit 3, an upper interval holding part 8B provided at an upper edge portion, and lateral interval holding parts 8C provided at end portions in the lateral direction.

As illustrated in FIG. 3, the lower interval holding part 8A is formed in a crank shape in a longitudinal sectional view, and has an mounting portion 82A having two stepped bent portions. The mounting portion 82A is provided in the vicinity of the end portions of the light guide plate 5 and the optical sheet 4. In addition, the lower interval holding part 8A has a tip portion 81A which is connected to one end portion of the mounting portion 82A, and is disposed between the light guide plate 5 and the optical sheet 4 on the light guide plate 5 side with respect to the mounting portion 82A. Further, the mounting portion 82A is provided with a leg plate 83A at the other end portion thereof, which extends from the other end portion in the thickness direction of the light guide plate 5. The mounting portion 82A and the leg plate 83A are formed in a hook shape in the longitudinal sectional view, and are locked with a tip of the side wall part 91 of the heat dissipation plate 9, such that the lower interval holding part 8A is held by the heat dissipation plate 9.

As described above, the mounting portion 82A has the two stepped bent portions in the longitudinal sectional view, and flat portions which are formed at the one end portion and the other end portion thereof. An end portion of the liquid crystal display panel 2 on the light source unit 3 side is disposed at a flat portion 84A of the other end portion with a cushion interposed therebetween. In other words, at a lower side in the longitudinal direction, the end portion of the liquid crystal display panel 2 is pinched by the display window 71 of the front cover 7 and the flat portion 84A of the lower interval holding part 8A through the cushion C.

The mounting portion 82A and the leg plate 83A have a black color, for example. In addition, it is not limited thereto, and these portions may have an achromatic color to be able to absorb light.

Meanwhile, the tip portion 81A (one end portion) is connected to the one end portion of the mounting portion 82A. More particularly, the tip portion 81A protrudes from an edge of the flat portion of the one end portion of the mounting portion 82A to the optical sheet 4 side. The tip portion 81A abuts the other surface of the optical sheet 4 by the tip thereof. The tip portion 81A has a white color, for example. In addition, it is not limited thereto, and this portion may have an achromatic color to be able to reflect light.

That is, a boundary of different colors defined by the black color of the mounting portion 82A and the white color of the tip portion 81A is present in the flat portion of the one end portion of the mounting portion 82A.

In the flat portion of the one end portion of the mounting portion 82A, a groove 85A is formed in a surface thereof on the light guide plate 5 side so as to astride the boundary of different colors. In addition, a cushion 6 is disposed at an edge portion of the one surface of the light guide plate 5 so as to be engaged to the groove 85A.

In other words, the boundary of different colors is configured so as to be present at a contact position between the cushion 6 (a buffer member) and the lower interval holding part 8A. More particularly, in the thickness direction of the light guide plate 5, the boundary of different colors is configured in such a manner that the position thereof matches with the position of the cushion 6. In addition, a positional shift of the cushion 6 may be prevented by the groove 85A.

As described above, since the liquid crystal display panel 2 is pinched by the display window 71 of the front cover 7 and the flat portion 84A of the lower interval holding part 8A, and the optical sheet 4 is supported by the tip of the tip portion 81A of the lower interval holding part 8A, the liquid crystal display panel 2, the optical sheet 4 and the light guide plate 5 may be held in a direction in which these components are juxtaposed while maintaining a constant interval therebetween.

Further, in the television receiving apparatus 100 according to the embodiment of the present invention, a so-called two-color molding method may be used in molding of the lower interval holding part 8A. Such the two-color molding method is a publicly known technique which is capable of obtaining a product having a plurality of colors by sequentially injecting two types of materials into a mold using a plurality of nozzles during injection molding, and therefore will not be described in detail herein.

Meanwhile, the light source unit 3 is provided in the vicinity of one side face of the light guide plate 5 at the lower side in the longitudinal direction. The light source unit 3 has the strip-shaped substrate 32 disposed to face the one side face of the light guide plate 5, and a plurality of light sources 31, 31, . . . and 31 mounted on one surface of the substrate 32 in the length direction of the substrate 32.

The light source 31 may be, for example, a cold cathode fluorescent lamp (CCFL), external electrode fluorescent lamp (EEFL), hot cathode fluorescent lamp (HCFL), light emitting diode (LED) or the like.

In the embodiment of the present invention, since the lower interval holding part 8A has the above-described configuration, it is possible to prevent shadows of the lower interval holding part 8A from being reflected on the liquid crystal display panel 2, while maintaining a constant interval between the liquid crystal display panel 2, the optical sheet 4 and the light guide plate 5.

That is, since the tip portion 81A of the lower interval holding part 8A, which is a central side of the light guide plate 5 with respect to the cushion 6, has the white color, light emitted from the one surface of the light guide plate 5 is reflected by the tip portion 81A, or is transmitted through the tip portion 81A. Thus, the light may not be leaked to the outside of the light guide plate 5 with respect to the cushion 6 (see solid line arrows in FIG. 3). Accordingly, the shadows of the lower interval holding part 8A are not reflected on the liquid crystal display panel 2, and it is possible to prevent that an abnormal feeling is provided to a user who views an image displayed on the liquid crystal display panel 2.

Further, in the present embodiment, since the lower interval holding part 8A has the above-described configuration, it is possible to prevent the light emitted from the light source 31 or reflected by the substrate 32 from becoming leakage light leaking from a joint of the front cover 7 or the liquid crystal display panel 2.

That is, since the mounting portion 82A of the lower interval holding part 8A, which is the outside of the light guide plate 5 with respect to the cushion 6, has the black color, light causing the leakage light is absorbed and shielded by the mounting portion 82A. Thus, the light may not be leaked to the outside through the joint of the front cover 7 or the liquid crystal display panel 2 (see a dashed line arrow in FIG. 3).

For example, when the position of the boundary of different colors does not match with the position of the cushion 6 in the thickness direction of the light guide plate 5, and is located at the central side of the light guide plate 5 with respect to the cushion 6, shadows due to absorption of light by the portion of the black color are reflected on the liquid crystal display panel 2. In addition, when the boundary of different colors is located at the outside of the light guide plate 5 with respect to the cushion 6, leakage of light is large due to the reflection by the portion of the white color.

However, in the television receiving apparatus 100 according to the embodiment of the present invention, as described above, since the position of the boundary of different colors matches with the position of the cushion 6 in the thickness direction of the light guide plate 5, it is possible to solve both of the problem that the shadows are reflected on the liquid crystal display panel 2, and the problem that the leakage light occurs.

Meanwhile, as illustrated in FIG. 4, the upper interval holding part 8B is formed in a crank shape in a longitudinal sectional view, and has an mounting portion 82B having two stepped bent portions. The mounting portion 82B is provided in the vicinity of the end portions of the light guide plate 5 and the optical sheet 4. In addition, the upper interval holding part 8B has a tip portion 81B (one end portion) which is connected to one end portion of the mounting portion 82B, and is disposed at the central side of the light guide plate 5 with respect to the mounting portion 82B. That is, the tip portion 81B is disposed between the light guide plate 5 and the optical sheet 4.

Further, the other end portion of the mounting portion 82B is provided with a leg plate 83B disposed parallel to the thickness direction of the light guide plate 5. The leg plate 83B has a strip shape, in which a longitudinal dimension thereof is substantially the same as the longitudinal dimension of the liquid crystal display panel 2, and a lateral dimension thereof is substantially the same as the thickness of the television receiving apparatus 100. The mounting portion 82B and the leg plate 83B are formed in a hook shape in the longitudinal sectional view, and are locked with the tip of the side wall part of the heat dissipation plate 9, such that the upper interval holding part 8B is held by the heat dissipation plate 9. In this case, edge of a front side among the long side edges of the leg plate 83B abuts inside of the front cover 7.

As described above, the mounting portion 82B has the two stepped bent portions in the longitudinal sectional view, and flat portions which are formed at the one end portion and the other end portion thereof. The end portion of the liquid crystal display panel 2 on the light source unit 3 side is disposed at a flat portion 84B of the other end portion with a cushion interposed therebetween. In other words, at an upper side in the longitudinal direction, the end portion of the liquid crystal display panel 2 is pinched by the display window 71 of the front cover 7 and the flat portion 84B of the upper interval holding part 8B through the cushion C.

In addition, the flat portion on the one end portion of the mounting portion 82B has an elongated rectangular support plate 86B protrusively formed toward the optical sheet 4. The support plate 86B has substantially the same long side dimension as the long side dimension of the optical sheet 4, and abuts the other surface of the optical sheet 4 by the tip of the long side thereof to support the optical sheet 4.

The mounting portion 82B and the leg plate 83B have a black color, for example. In addition, it is not limited thereto, and these portions may have an achromatic color to be able to absorb light.

Meanwhile, the tip portion 81B is connected to the one end portion of the mounting portion 82B. More particularly, the tip portion 81B protrudes from an edge of the flat portion on the one end portion of the mounting portion 82B toward the optical sheet 4 side. The tip portion 81B abuts the other surface of the optical sheet 4 by the tip thereof, as similar to the support plate 86B. The tip portion 81B has a white color, for example. In addition, it is not limited thereto, and this portion may have an achromatic color to be able to absorb light.

That is, a boundary of different colors defined by the black color of the mounting portion 82B and the white color of the tip portion 81B is present in the flat portion on the one end portion of the mounting portion 82B. More particularly, the boundary of different colors is formed between the support plate 86B and the tip portion 81B.

In the flat portion on the one end portion of the mounting portion 82B, a groove 85B is formed in a surface thereof on the light guide plate 5 side so as to astride the boundary of different colors. That is, the groove 85B is formed in the surface of the flat portion on the light guide plate 5 side at a middle position between the support plate 86B and the tip portion 81B. In addition, a cushion 6 is disposed at an edge portion of the one surface of the light guide plate 5 so as to be engaged to the groove 85B.

In other words, the boundary of different colors is configured so as to be present at a contact position between the cushion 6 and the upper interval holding part 8B. More particularly, in the thickness direction of the light guide plate 5, the boundary of different colors is configured in such a manner that the position thereof matches with the position of the cushion 6. In addition, a positional shift of the cushion 6 may be prevented by the groove 85B.

As described above, since the liquid crystal display panel 2 is pinched by the display window 71 of the front cover 7 and the flat portion 84B of the upper interval holding part 8B, and the optical sheet 4 is supported by the support plate 86B and the tip of the tip portion 81B of the upper interval holding part 8B, the liquid crystal display panel 2, the optical sheet 4 and the light guide plate 5 may be held in a direction in which these components are juxtaposed while maintaining a constant interval therebetween.

In the embodiment of the present invention, since the upper interval holding part 8B has the above-described configuration, it is possible to prevent shadows of the upper interval holding part 8B from being reflected on the liquid crystal display panel 2, while maintaining a constant interval between the liquid crystal display panel 2, the optical sheet 4 and the light guide plate 5 (see solid line arrows in FIG. 4).

In addition, in the embodiment of the present invention, since the upper interval holding part 8B has the above-described configuration, light from the side face of the light guide plate 5 does not become the leakage light, and is absorbed and shielded by the mounting portion 82B. Thus, the light may also not be leaked to the outside through the joint of the front cover 7 or the liquid crystal display panel 2 (see a dashed line arrow in FIG. 4).

Further, as illustrated in FIG. 5, the lateral interval holding part 8C has an mounting portion 82C formed in a crank shape in a longitudinal sectional view. The mounting portion 82C is provided in the vicinity of the end portions of the light guide plate 5 and the optical sheet 4. In addition, the lateral interval holding part 8C has a tip portion 81C which is connected to one end portion of the mounting portion 82C, and is disposed between the light guide plate 5 and the optical sheet 4 at the central side of the light guide plate 5 with respect to the mounting portion 82C. Further, the mounting portion 82C is provided with a leg plate 83C at the other end portion thereof, which extends from the other end portion in the thickness direction of the light guide plate 5. The mounting portion 82C and the leg plate 83C are formed in a hook shape in the longitudinal sectional view, and are locked with a tip of the side wall part of the heat dissipation plate 9, such that the lateral interval holding part 8C is held by the heat dissipation plate 9.

The mounting portion 82C has flat portions which are formed at the one end portion and the other end portion thereof. The end portion of the liquid crystal display panel 2 on the light source unit 3 side is disposed at a flat portion 84C of the other end portion with a cushion interposed therebetween. In other words, at an end portion in the lateral direction, the end portion of the liquid crystal display panel 2 is pinched by the display window 71 of the front cover 7 and the flat portion 84C of the lateral interval holding part 8C through the cushion C.

The mounting portion 82C and the leg plate 83C have a black color, for example. In addition, it is not limited thereto, and these portions may have an achromatic color to be able to absorb light.

Meanwhile, the tip portion 81C (one end portion) is connected to the one end portion of the mounting portion 82C, and the tip portion 81C has the same shape as the above-described tip portion 81A, and therefore will not be described.

In addition, also in the lateral interval holding part 8C, the boundary of different colors is configured so as to be present at the contact position between the cushion 6. That is, in the thickness direction of the light guide plate 5, the boundary of different colors is configured in such a manner that the position thereof matches with the position of the cushion 6.

Accordingly, also in the lateral interval holding part 8C, it is possible to prevent shadows of the lateral interval holding part 8C from being reflected on the liquid crystal display panel 2 (see solid line arrows in FIG. 5). In addition, light from the side face of the light guide plate 5 does not become the leakage light, and it is possible to prevent the light from being leaked to the outside through the joint of the front cover 7 or the liquid crystal display panel 2 (see a dashed line arrow in FIG. 5).

It is noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A light source device which includes a light guide plate configured to emit light entered from a light source of a side face of the light guide plate through one surface of the light guide plate, and an optical sheet disposed to face the one surface of the light guide plate, comprising:
   an interval holding part which is provided along side face of the light guide plate, and is configured so that one portion thereof is disposed between the optical sheet and the light guide plate to maintain an interval between the optical sheet and the light guide plate,
   wherein the interval holding part includes a first portion located between the optical sheet and the light guide plate, and a second portion which is connected to the first portion and is provided at an outside of the light guide plate, the first portion supporting the optical sheet by a tip of the first portion and holding the light guide plate through a buffer member contacting to a predetermined region of the first portion, and
   in the first portion, a portion closer to the tip than a predetermined boundary position in the predetermined region has an achromatic color to be able to reflect light and a portion closer to the second portion than the predetermined boundary position has an achromatic color to be able to absorb light.

2. The light source device according to claim 1, wherein the second portion has an achromatic color to be able to absorb light.

3. The light source device according to claim 1, wherein the first portion includes a parallel portion which is approximately parallel to the one surface of the light guide plate and an orthogonal portion which is approximately orthogonal to the one surface and includes the tip, and
   the predetermined boundary position is located in the parallel portion.

4. A display apparatus comprising:
   the light source device according to claim 1; and
   a display panel configured to display an image using light passed through the optical sheet.

5. A display apparatus comprising:
   the light source device according to claim 2; and
   a display panel configured to display an image using light passed through the optical sheet.

6. A display apparatus comprising:
   the light source device according to claim 3; and
   a display panel configured to display an image using light passed through the optical sheet.

7. The light source device according to claim 1, wherein a groove is formed on a surface of the interval holding part facing the one surface of the light guide plate so as to astride the predetermined boundary position, and the buffer member is disposed in the groove.

8. The light source device according to claim 1, wherein the tip of the first portion protrudes from an edge of the first portion toward the optical sheet and abuts the optical sheet.

* * * * *